United States Patent
Bi (12)

(10) Patent No.: US 9,112,440 B2
(45) Date of Patent: Aug. 18, 2015

(54) SENSORLESS DYNAMIC DRIVING METHOD AND SYSTEM FOR SINGLE PHASE ALTERNATING CURRENT PERMANENT MAGNET MOTOR

(71) Applicant: Lei Bi, Singapore (CN)

(72) Inventor: Lei Bi, Singapore (CN)

(73) Assignee: FORTIOR TECHNOLOGY (SHENZHEN) CO., LTD., Shenzhen (CN)

( * ) Notice: Subject to any disclaimer, the term of this patent is extended or adjusted under 35 U.S.C. 154(b) by 1 day.

(21) Appl. No.: 14/138,983

(22) Filed: Dec. 23, 2013

(65) Prior Publication Data
US 2014/0111127 A1    Apr. 24, 2014

Related U.S. Application Data

(63) Continuation of application No. PCT/CN2011/076148, filed on Jun. 22, 2011.

(51) Int. Cl.
*H02P 6/20* (2006.01)
*H02P 6/18* (2006.01)
*H02P 6/00* (2006.01)

(52) U.S. Cl.
CPC *H02P 6/20* (2013.01); *H02P 6/008* (2013.01); *H02P 6/182* (2013.01)

(58) Field of Classification Search
CPC ......................................................... H02P 6/20
USPC ................... 318/400.11, 400.09, 400.01, 700
See application file for complete search history.

(56) References Cited

U.S. PATENT DOCUMENTS

| | | | |
|---|---|---|---|
| 5,859,519 A * | 1/1999 | Archer | 318/801 |
| 5,969,491 A * | 10/1999 | Viti et al. | 318/400.35 |
| 7,002,307 B2 * | 2/2006 | Yoshitomi et al. | 318/400.29 |

* cited by examiner

*Primary Examiner* — David S Luo

(57) ABSTRACT

A sensorless driving method for a single phase alternating current permanent magnet motor is described. The method comprises a starting drive mode and a stable drive mode. The starting drive mode comprises inputting a first current to drive a rotor to rotate to a stable position, the first current comprising a pulse current flowing in a first direction for a first predetermined starting time interval and a constant current flowing in a second direction contrary to the first direction for a second predetermined time interval, terminating the first current, determining generation of a back electromotive force, detecting a first zero crossing point of the back electromotive force, inputting a second current for a first charge time interval, waiting for a first post-charge time interval, detecting a second zero crossing point to define a previous half period between the first zero crossing point and the second crossing point, inputting the second current for a second charge time interval, waiting for a second post-charge time interval, and detecting speed of the rotor to compare the speed to a predetermined value. The second current flows in a direction in which the back electromotive force is generated.

14 Claims, 6 Drawing Sheets

SENSORLESS DYNAMIC DRIVING METHOD AND SYSTEM FOR SINGLE PHASE ALTERNATING CURRENT PERMANENT MAGNET MOTOR

CROSS-REFERENCE TO RELATED APPLICATION

This application is a continuation of PCT/CN2011/076148, filed Jun. 22, 2011, the entire content of which is incorporated herein by reference in its entirety.

TECHNICAL FIELD

The present invention relates to a motor driving method and system, more particularly to a sensorless driving method for a single phase alternating current permanent magnet motor.

BACKGROUND

Single phase alternating current permanent magnet motors are widely used in electronic apparatus for driving electronic apparatus, such as cooling fan of computer, drain pump of washing machine, and the like. Referring to FIG. 1, a single phase alternating current permanent magnet motor may include a rotor. The rotor includes a rotor core 1 and a rotor magnet 2, which includes a north pole 21 and a south pole 22. The single phase alternating current permanent magnet motor may further include a stator core 3, and a winding (FIG. 1 illustrates an input end 41 and an output end 42 of the winding). A hall unit 5 is disposed adjacent to the rotor magnet 2 for determining position of the rotor accurately and reliably.

To install the hall unit 5 to a predetermined position, a plurality of additional fixing accessories may be used. The plurality of the additional fixing accessories and the hall unit 5 may occupy extra spaces in the motor, which may increase cost and volume of the motor, and further reduce reliability of the motor.

SUMMARY

Through applied effort, ingenuity, and innovation, solutions to improve a driving method and system for single phase alternating current permanent magnet motor have been realized and are described herein.

According to one exemplary embodiment of the subject disclosure, a sensorless driving method for a single phase alternating current permanent magnet motor is described. The method comprises a starting drive mode and a stable drive mode. The starting drive mode comprises inputting a first current to drive a rotor to rotate to a stable position, the first current comprising a pulse current flowing in a first direction for a first predetermined starting time interval and a constant current flowing in a second direction contrary to the first direction for a second predetermined time interval, terminating the first current, determining generation of a back electromotive force, detecting a first zero crossing point of the back electromotive force, inputting a second current for a first charge time interval, waiting for a first post-charge time interval, detecting a second zero crossing point to define a previous half period between the first zero crossing point and the second crossing point, inputting the second current for a second charge time interval, waiting for a second post-charge time interval, and detecting speed of the rotor to compare the speed to a predetermined value. The second current flows in a direction in which the back electromotive force is generated.

According to one exemplary embodiment of the subject disclosure, a sensorless driving method for a single phase alternating current permanent magnet motor is described. The method comprises a starting drive mode and a stable drive mode. The stable drive mode comprises detecting a first zero crossing point of a back electromotive force, inputting drive current after a first predetermined time interval after detection of appearance of a first ZCP; keeping the drive current with a second predetermined time interval, terminating the current before detection of appearance of a second ZCP and detecting appearance of the second zero crossing point.

BRIEF DESCRIPTION OF THE DRAWINGS

Figure 1:
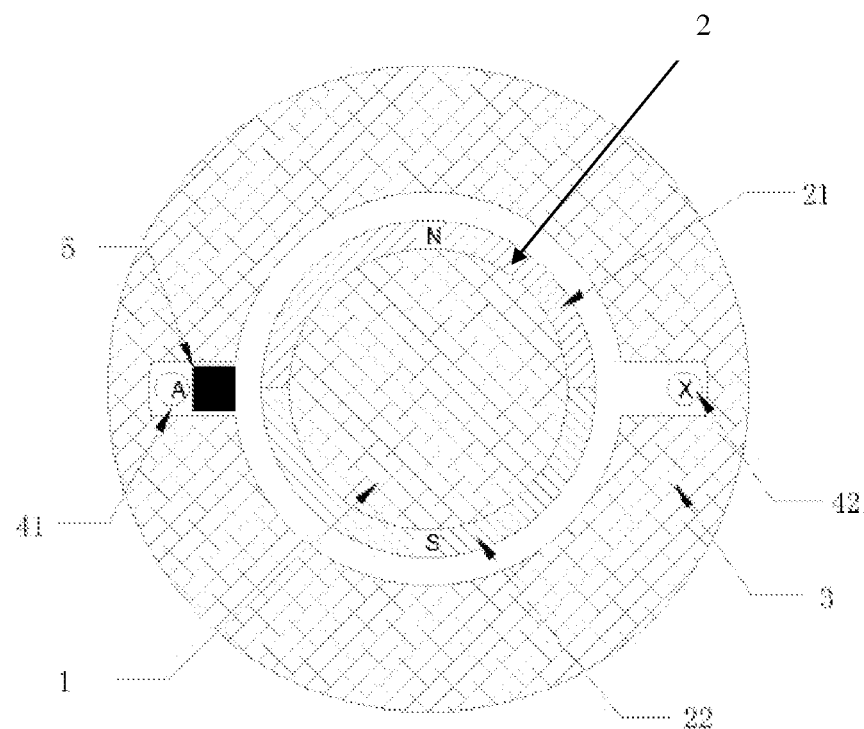
Figure 2:
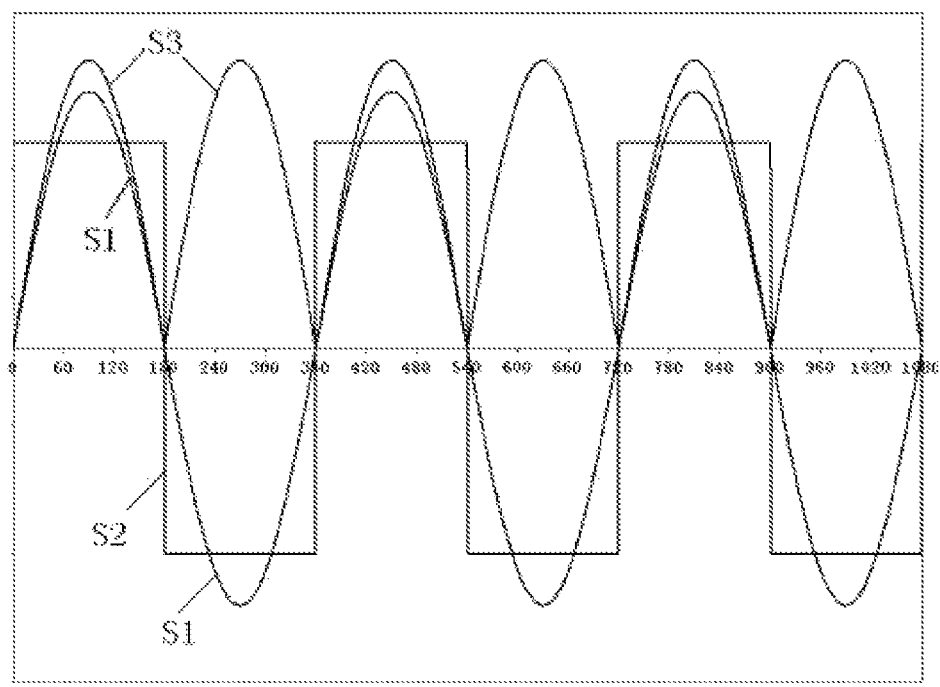
Figure 3:
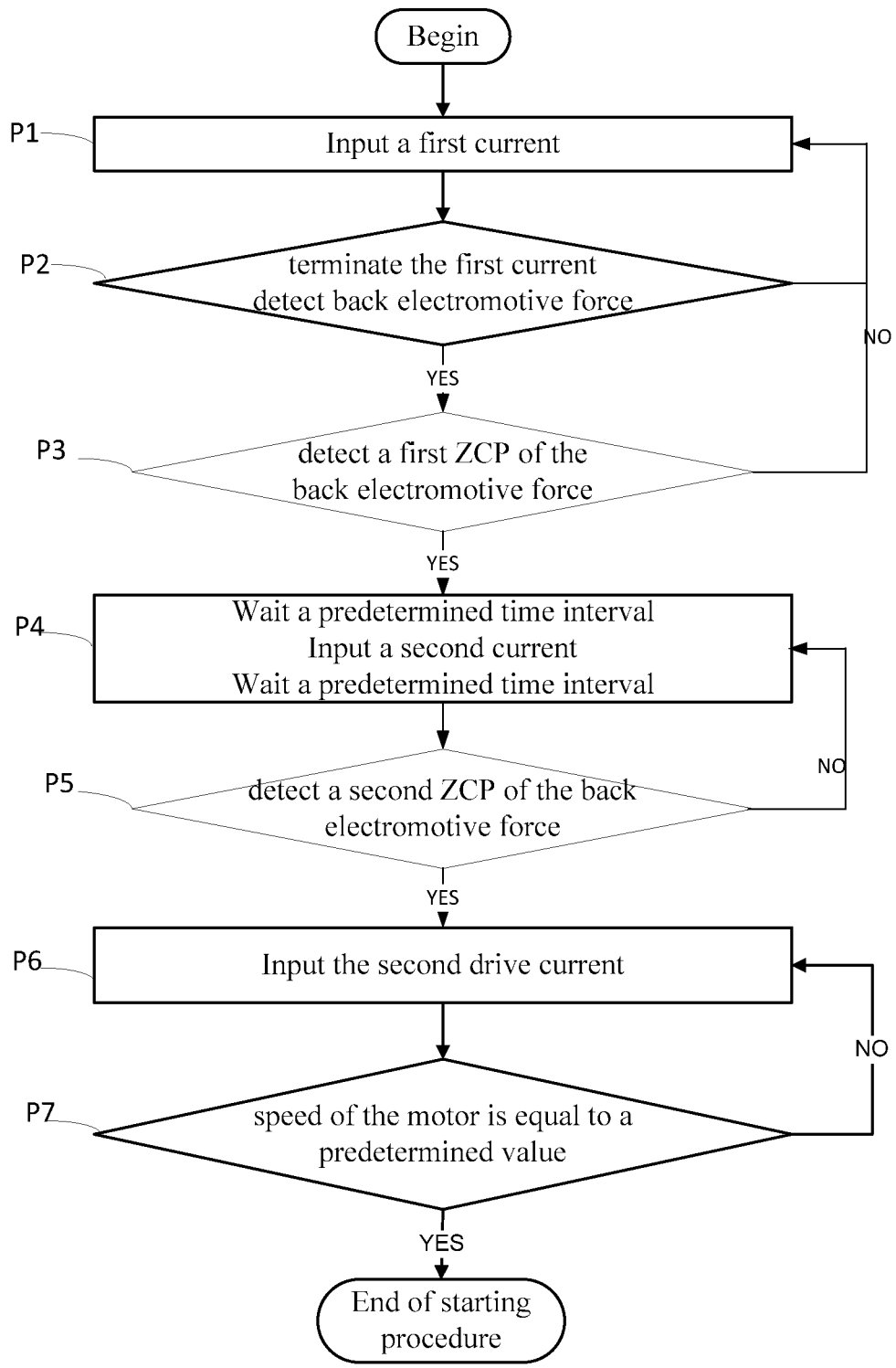
Figure 4:
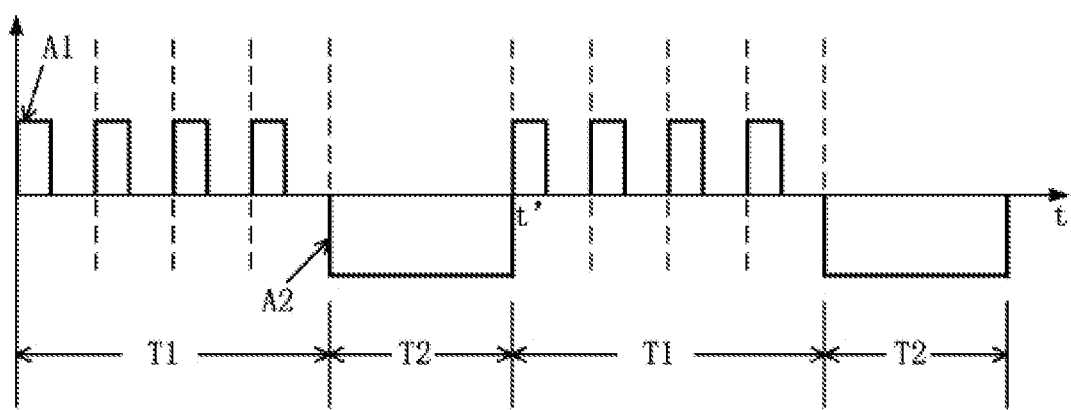
Figure 5:
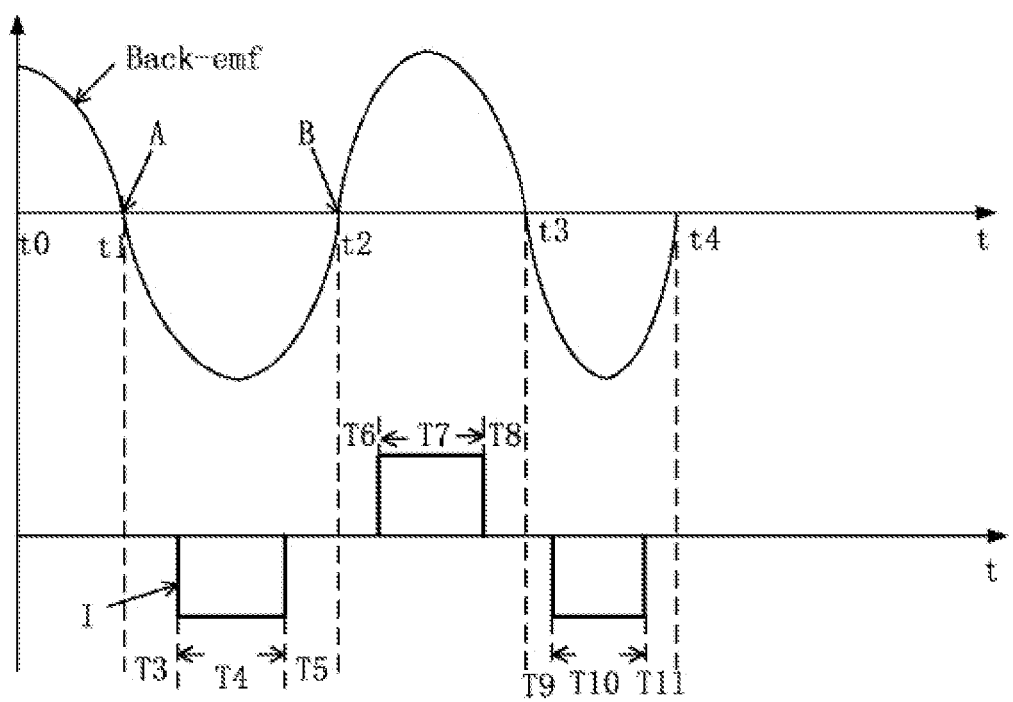
Figure 6:
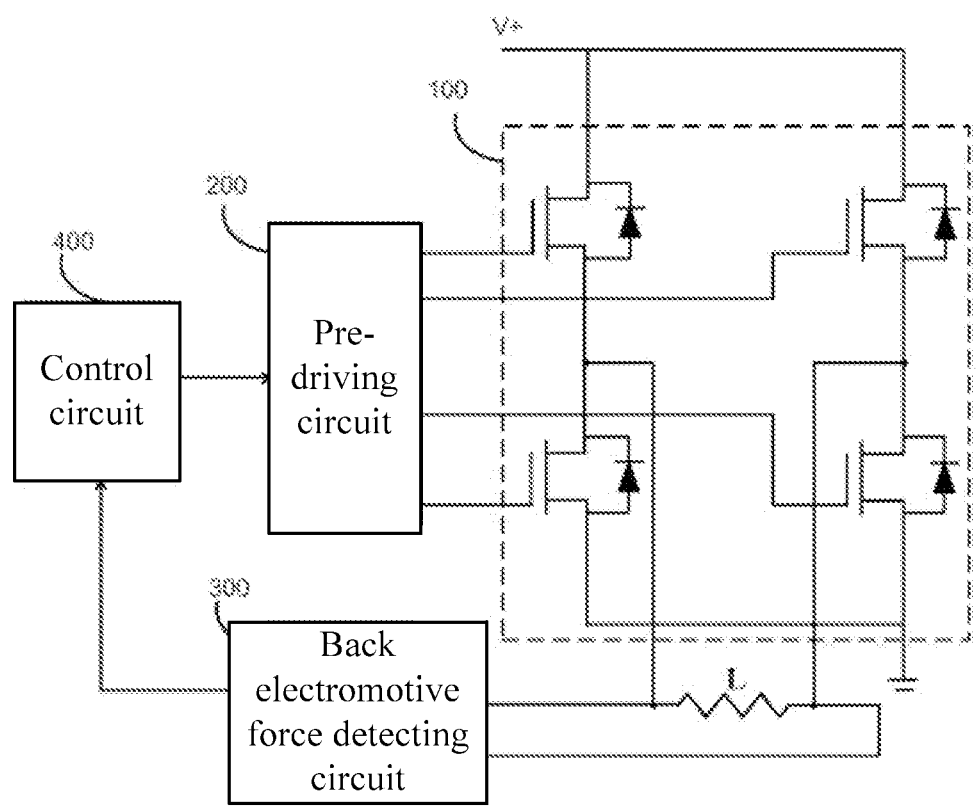

Having thus described some embodiments in general terms, reference will now be made to the accompanying drawings, which are not necessarily drawn to scale. The embodiments illustrated in the figures of the accompanying drawings herein are by way of example and not by way of limitation, and wherein:

FIG. 1 illustrates a structure of a single phase alternating current permanent magnet motor;

FIG. 2 illustrates a waveform of a back electromotive force generated by a motor;

FIG. 3 is a flow chart of a sensorless driving method for a single phase alternating current permanent magnet motor according to exemplary embodiments of the disclosure;

FIG. 4 illustrates a waveform of a first current in the sensorless driving method of FIG. 3 according to exemplary embodiments of the disclosure;

FIG. 5 illustrates a waveform of a back electromotive force and a second current in the sensorless driving method of FIG. 3 according to exemplary embodiments of the disclosure; and FIG. 6 illustrates a circuit diagram of a sensorless driving system of the single phase alternating current permanent magnet motor according to exemplary embodiments of the disclosure.

DETAILED DESCRIPTION

Having thus described some embodiments in general terms, reference will now be made to the accompanying drawings, which are not necessarily drawn to scale. The embodiments illustrated in the figures of the accompanying drawings herein are by way of example and not by way of limitation, and wherein:

FIG. 2 is a waveform of a back electromotive force generated by a motor according to exemplary embodiments of the disclosure. Referring to FIG. 2, horizontal axis is rotation angles of a rotor. Waveform S1 is a waveform of a back electromotive force generated in a machine winding when the rotor is in a specific position. When a current is input into the winding, an electromagnetic torque may be generated. Waveform S2 and waveform S3 respectively illustrate input current and electromagnetic torque generated by the input current.

FIG. 3 illustrates a flow chart of a sensorless driving method for a single phase alternating current permanent magnet motor according to exemplary embodiments of the disclosure. As shown in FIG. 3, a first current is input into the machine winding to drive a rotor to rotate at step P1.

The rotor may be in a starting drive mode before the rotor starts to rotate stably. In this mode, the rotor may be locked at a stable position by a cogging torque of the motor. When the first current is input, the machine winding may generate a magnetic field associated with the first current. An electromagnetic torque may be produced by the rotor as a result of the interaction between the magnetic field generated by the permanent magnetic attached to the rotor and the magnetic field generated by the current generated by the machine winding. The rotor is driven to move away from the stable position, and then rotate gradually toward to a new stable position determined by the first current.

FIG. 4 illustrates a waveform of the first current. With reference to FIGS. 3 and 4, the first current may comprise a pulse current A1 flowing in a first direction for a first predetermined time interval T1 and a constant current A2 flowing in a second direction contrary to the first direction for a second predetermined time interval T2. The pulse current A1 may be a forward current. The constant current A2 may be a reversed current. Duty cycle of current A1 may be about 20%~90%. The rotor may be driven by the pulse current A1 to rotate to a stable position in a first direction during the first predetermined time interval T1. The constant current A2 may drive the machine winding to rotate to a second direction contrary to the first direction in the second predetermined time interval T2. In this embodiment, the first and second predetermined time intervals T1 and T2 may be determined by parameters of the motor, load carried by the motor, and the motor starting time.

The pulse current A1 may be terminated at step P2. The method judges whether the back electromotive force of the machine winding is generated. If it is determined that the back electromotive force is generated, the method proceeds to step P3. Otherwise, the procedure goes back to step P1.

The rotational inertia may keep the rotor running although the pulse current A1 is terminated. Because there is no current flowing through the machine winding, the voltage difference of the winding terminals is the back electromotive force. The motor may exit the starting drive mode once the back electromotive force is detected.

In the starting drive mode, when the back electromotive force is detected, a first half period of a back electromotive force may be generated. In the first half period of the back electromotive force, the time of introducing the input current, a time period of the input current, and the time of terminating the current may not be known to the system. Therefore, the current introduction time and the time period of the input current may be determined by parameters of the motor, the load carried by the motor, and the time starting the motor during the first half period of the back electromotive force. When a second half period of the back electromotive force is detected the current introduction time and the time period of the input current introduced may be determined based upon those of the first half period.

At step P3, it is determined if a first zero crossing point (ZCP) of the back electromotive force appears and if it is detectable. If the first ZCP is not detectable at step P3, the method proceeds to step P1. If the first ZCP is detectable, e.g., ZCP A is detectable at t1 as shown in FIG. 5, the method may wait for a first pre-charge time interval T3 and then introduce a second current. The second current may be a constant current and last for a first charge time interval T4 at step P4. The second current may be terminated prior to appearance and detection of a second ZCP B. The first pre-charge time interval and the first charge time interval may be determined by parameters of the motor, the load carried by the motor, and the time starting the motor.

After a first post-charge time interval T5 posterior to the termination of the second current, the method may determine if the second ZCP appears at step P5. If the second ZCP appears and is detected, the method then proceeds to step P6. The method may otherwise proceed back to step P4.

FIG. 5 illustrates a waveform of the back electromotive force and the second current input. The second current I may be a pulse current introduced to the machine winding and may flow in the same direction as in which the back electromotive force is generated. As illustrated in FIG. 5, the first ZCP A may be detected at t1. The second current may be introduced after the first pre-charge time interval T3. The second current may last for the first charge time interval T4 and may be terminated prior to appearance of the second ZCP B of the back electromotive force. A first post-charge time interval T5 may be taken between the termination of the second current and appearance of the second ZCP B at t2. There may be no second current flowing through the machine winding during the first pre-charge time interval T3. Referring back to FIG. 2, the second current may flow in the same direction as in which the back electromotive force is generated. In another word, the second current is a reversed current. The first pre-charge time interval T3 and the first charge time interval T4 may be determined by parameters of the motor, the load carried by the motor, and the time starting the motor. After the first post-charge time interval T5 posterior to the termination of the second current, the second ZCP may appear and be detected.

In this embodiment, the first pre-charge time interval T3 may be set to be 0%~50% of the second predetermined time interval T2. The first charge time interval T4 may be set to be 10%~80% of the second predetermined time interval T2. The first pre-charge time interval T3 and the first charge time interval T4 may be determined by parameters of the motor, the load carried by the motor, and the time starting the motor. After the first half period of the back electromotive force, the method proceeds to step P6.

At step P6, with reference to FIG. 5, when the second ZCP appears and is detected at t2, the second current may be input in the same direction as in which the back electromotive force is generated. The second current may be input after a second pre-charge time interval posterior to appearance of the second ZCP and may last for a second charge time interval T7. The second pre-charge time interval T6 and the second charge time interval T7 may be determined by the half period prior to the current half period, namely the period between t1 and t2. For brevity and convenience, the half period prior to the current half period, namely, the half period between the first ZCP A and the second ZCP B, is defined as previous half period. The second current may be terminated before the expiration of the current half period of the back electromotive force. The current half period may expire after a second post-charge time interval T8 posterior to the termination of the second current. In one embodiment, the second pre-charge interval time T6 may be zero. In other words, the second current may be input immediately after the appearance and detection of the second ZCP.

In one embodiment, the second charge time interval T7 may be set to be 50%~90% of the previous half period. The second post charge time interval T8 may be set to be 0%~50% of the previous half period. Sum of the second charge time interval T7 and second post charge time interval T8 may be smaller than the previous half period. The second pre-charge time interval T6 may be between 0 and (t2−t1)*50%. The second charge time interval T7 may be between (t2−t1)*50% and (t2−t1)*90%.

At step P7, speed of the rotor may be detected and compared to a predetermined value. If the speed of the rotor is determined to be equal to the predetermined value, the method ends. The procedure may otherwise return to step P6. In one embodiment, the predetermined value may be set to be 70%~95% of a speed that keeps the machine rotating stably. The predetermined value may be determined by parameters of the motor, rotational inertia to keep the motor rotate, cogging torque of the motor, and speed that may keep the rotor rotate evenly and stably.

If the speed of the rotor is determined to be larger or smaller than the predetermined value at step P7, with reference to FIG. 5, the second current may be input after a third pre-charge time interval T9 in a half period posterior to the current period of the back electromotive force. For brevity and convenience, the half period posterior to the current period of the back electromotive force is defined as post half period. The second current may last for a third charge time interval T10. The second current may be terminated before the post half period expires. A third post-charge time interval T11 may exist between the termination of the second current and before the post half period expires, e.g., at t4. The speed of the rotor may be detected at t4 again to determine whether it is equal to the predetermined value. The procedure may be determined to end or enter another half period based on the result of P7.

The above steps show a sensorless starting procedure of the single-phase alternating current permanent magnet motor. After the starting procedure, the motor operates at a predetermined speed, and the motor may exit the starting drive mode and enter stable drive mode. In the stable drive mode, the back-electromagnetic force may be easier to be detected causing a relatively easier detection of a ZCP signal. Speed of the motor may be detected accurately. Waveform of the drive current, such as drive current I, may also be illustrated by FIG. 5. As shown in FIG. 5, the drive current I have time intervals T3 to T11. The drive current I may be regulated in the same direction as in which the back-electromagnetic force appears. In the stable operation mode, the negative current and positive current may be symmetric about the time domain. More specifically, first pre-charge time interval T3 may be equal to second pre-charge time interval T6. First charge time interval T4 may be equal to second charge time interval T7. First post charge time interval T5 may be equal to second post time interval T8. Charge time may be about 70%~95% of one cycle in stable drive mode. For example, T4 may be about 70%~95% of (T3+T4+T5).

FIG. 6 is a circuit diagram of a sensorless driving system 600 of the single phase alternating current permanent magnet motor according to exemplary embodiments of the disclosure. The system 600 may include a full-bridge power switch 100, a pre-driving circuit 200, a back electromotive force detecting circuit 300, and a control circuit 400. A machine winding L is connected between two terminals of the power switch 100. The back electromotive force detecting circuit 300 is configured to detect a voltage signal indicative of back electromotive force generated between the two terminals, and then transmit the voltage signal to the control circuit 400. The control circuit 400 may generate a control signal in response to the voltage signal. The pre-driving circuit 200 may receive the control signal and control the power switch 100 to generate and terminate current flowing through the machine winding L.

It will be appreciated by those skilled in the art that changes could be made to the examples described above without departing from the broad inventive concept. It is understood, therefore, that this disclosure is not limited to the particular examples disclosed, but it is intended to cover modifications within the spirit and scope of the disclosure as defined by the appended claims. Although specific terms are employed herein, they are used in a generic and descriptive sense only and not for purposes of limitation.

What is claimed is:

1. A sensorless driving method for a single phase alternating current permanent magnet motor, the method comprising a starting drive mode and a stable drive mode, the starting drive mode comprising:
   inputting a first current to drive a rotor to rotate to a stable position, the first current comprising a pulse current flowing in a first direction for a first predetermined starting time interval and a constant current flowing in a second direction contrary to the first direction for a second predetermined time interval;
   terminating the first current;
   determining generation of a back electromotive force;
   detecting a first zero crossing point of the back electromotive force;
   inputting a second current for a first charge time interval;
   waiting for a first post-charge time interval:
   detecting a second zero crossing point to define a previous half period between the first zero crossing point and the second crossing point;
   inputting the second current for a second charge time interval;
   waiting for a second post-charge time interval; and
   detecting speed of the rotor to compare the speed to a predetermined value, wherein the second current flows in a direction in which the back electromotive force is generated.

2. The sensorless driving method of claim 1, detecting speed of the rotor to compare the speed to a predetermined value further comprising inputting the second current in an instance in which the speed is not equal to the predetermined value.

3. The sensorless driving method of claim 1, further comprising waiting for a first pre-charge time interval posterior to detecting the first zero cross point.

4. The sensorless driving method of claim 3, wherein the first pre-charge time internal is less than 50% of the second predetermined time interval.

5. The sensorless driving method of claim 1, wherein the first charge time interval is less than 80% of the second predetermined time interval and larger than 10% of the second predetermined time interval.

6. The sensorless driving method of claim 1, further comprising waiting for a second pre-charge time interval posterior to detecting the second zero cross point.

7. The sensorless driving method of claim 6, wherein the second pre-charge time interval is less than 50% of time period of the previous half period.

8. The sensorless driving method of claim 1, wherein the second charge time interval is less than 90% of time period of the previous half period and larger than 50% of the previous half period.

9. The sensorless driving method of claim 1, wherein the first current flowing in a first direction is a pulse current.

10. The sensorless driving method of claim 9, further comprising terminating the pulse current.

11. The sensorless driving method of claim 1, wherein the first current flowing in a second direction is a constant current.

12. The sensorless driving method of claim 1, wherein the duty cycle of the first current flowing in the first direction is between 20% and 90%.

13. The sensorless driving method of claim 1, wherein the first current flowing in the second direction contrary to the first direction is a constant current.

14. The sensorless driving method of claim 1, wherein the predetermined value is 70% ~95% of a speed that keeps the rotor rotating stably.

* * * * *